Nov. 16, 1943.　　A. T. ZAPPIA　　2,334,684
INTERMITTENT DRIVE MECHANISM
Filed Aug. 7, 1942　　3 Sheets-Sheet 1
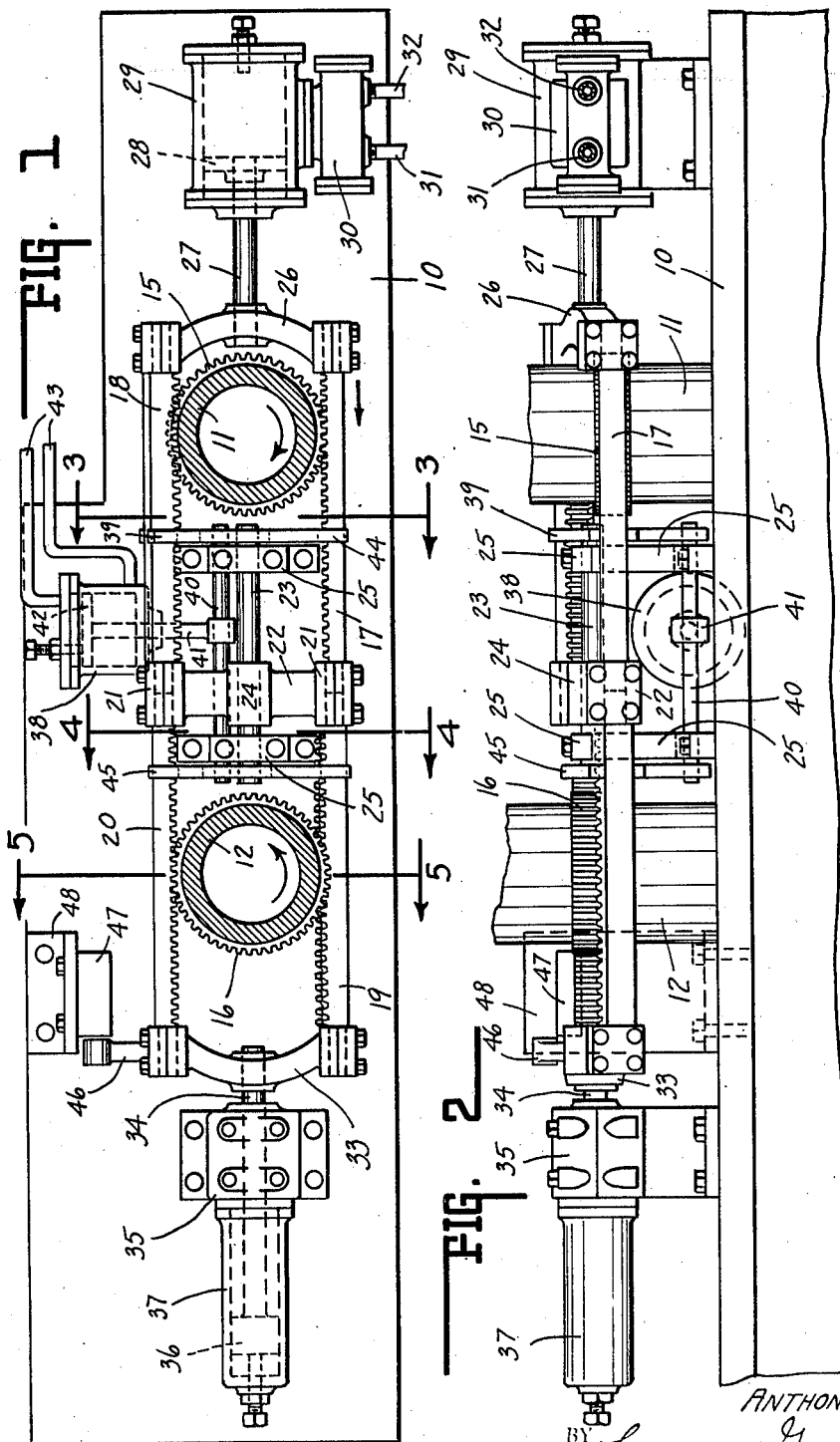
INVENTOR.
ANTHONY T. ZAPPIA.
BY Lockwood, Goldsmith & Galt
ATTORNEYS Nov. 16, 1943.  A. T. ZAPPIA  2,334,684
INTERMITTENT DRIVE MECHANISM
Filed Aug. 7, 1942  3 Sheets-Sheet 2
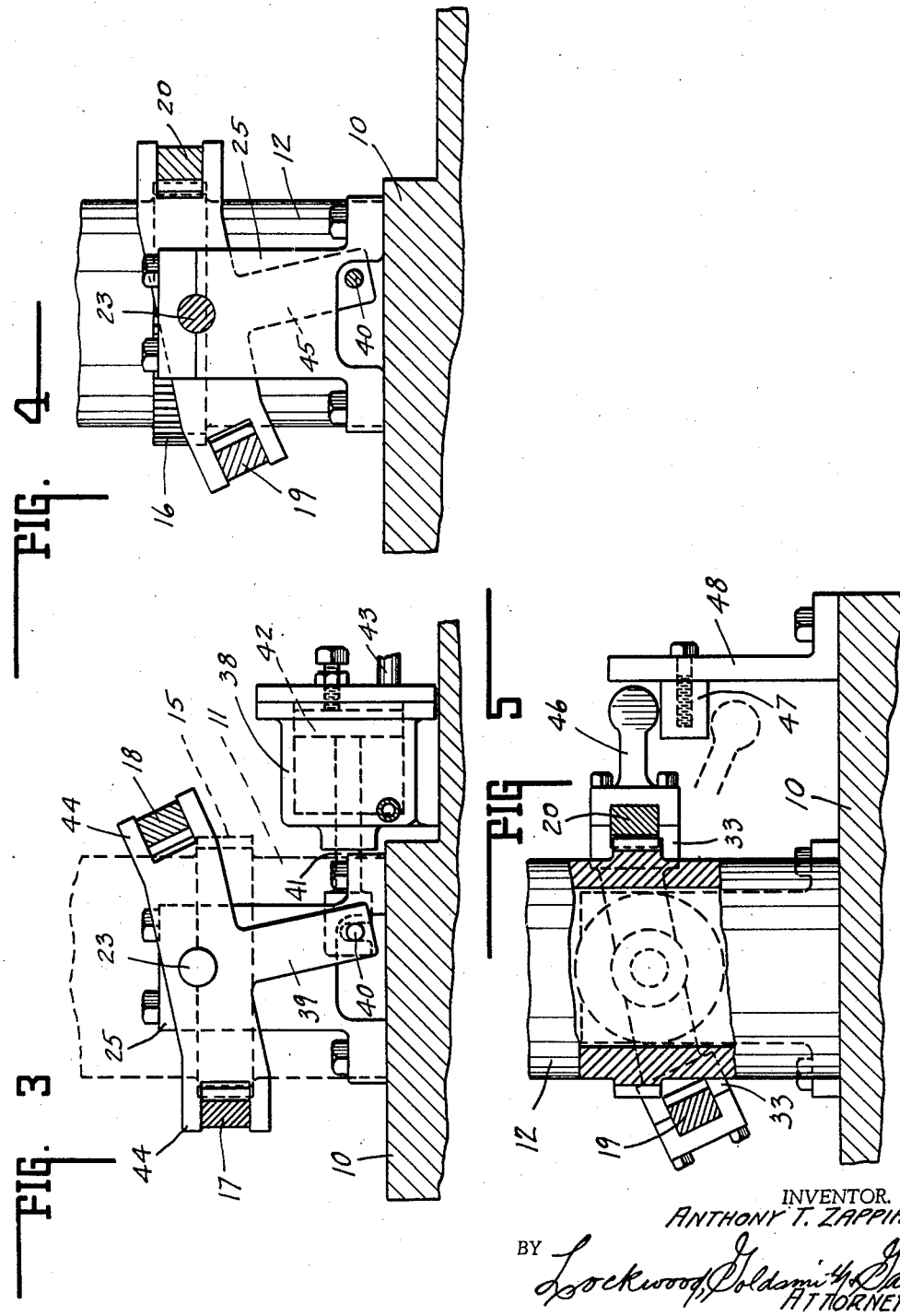
INVENTOR.
ANTHONY T. ZAPPIA.
BY Lockwood, Goldsmith & Galt.
ATTORNEYS.

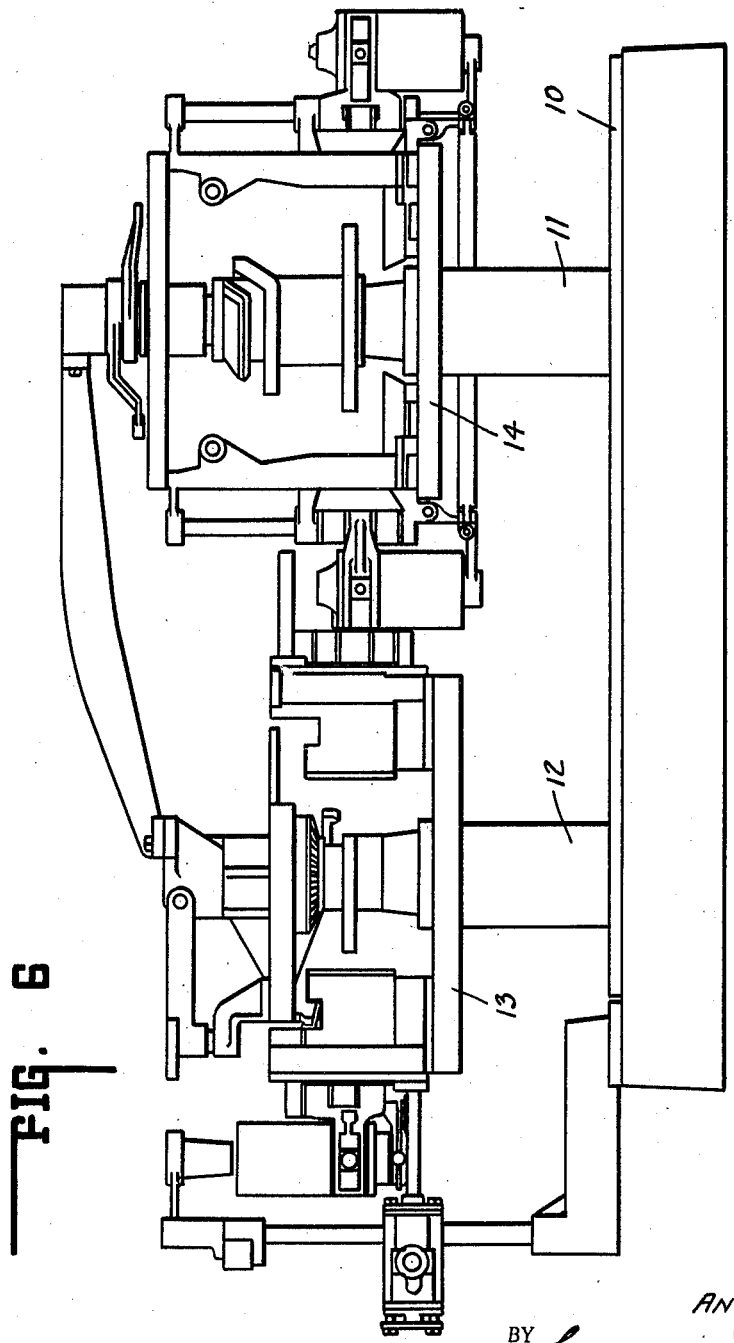

Patented Nov. 16, 1943

2,334,684

UNITED STATES PATENT OFFICE 2,334,684

INTERMITTENT DRIVE MECHANISM

Anthony T. Zappia, Indianapolis, Ind., assignor to Fairmount Glass Works, Inc., Indianapolis, Ind., a corporation Application August 7, 1942, Serial No. 453,999

7 Claims. (Cl. 74—30)

This invention relates to an intermittent drive mechanism, particularly adapted and useful for intermittently rotating one or more glass forming machine turrets.

In respect to driving mechanism for glass forming machine turrets, it is desirable that they be intermittently driven in timed relation to each other wherein there is employed a parison mold turret from which the parison is to be delivered to the finish mold turret. Said turrets are usually intermittently driven at the same speed in close tangential relation and traveling in opposite directions. The gob of molten glass is received in the parison mold from a feeder when it is temporarily in arrested position and is then carried 180 degrees intermittently while adjacent following molds are being fed and the parison is being subjected to compressed air for forming. At its tangential meeting with the finish mold, means are provided for lifting the parison from the parison mold and transferring it to the finish mold on the finish mold turret during one of the arrested periods. It is important that the turrets rotate in opposite directions in accurately timed relation to permit of the proper functioning of the transfer mechanism.

Heretofore it has been customary to provide a rack and pinion drive for one turret and coupling said time driven turret with the other or second driven turret through a train of driving gears and pinions. This is made necessary by reason of the fact that the turrets are driven in opposite directions. Difficulty has been experienced, however, in the driving of one turret from the other by a train of gears. As the gear teeth or bearings become only slightly worn, such wear is multiplied sufficiently to produce inaccurate timing between the two turrets. Attempts have been made to meet this difficulty by adjustments which require both skill and constant attention. Often difficulty will be had and a substantial amount of glassware rendered defective prior to or during such adjustment.

It is, therefore, the purpose of this invention to provide a greatly simplified driving mechanism for the turrets, and cause the driving action thereof to at all times be accurately maintained. Thus, the driving action is so direct, as distinguished from passing through a train of gears that slight wear as between the rack and pinions will not be sufficient to produce damaging inaccuracy in timing.

The full nature of the invention will be understood from the accompanying drawings and the following description and claims:

Fig. 1 is a plan view of the driving mechanism taken on a horizontal section through the supporting and driving spindles of the turrets. Fig. 2 is a side elevation showing that part of the mechanism illustrated in Fig. 1. Fig. 3 is a section taken on the line 3—3 of Fig. 1 with parts removed. Fig. 4 is a section taken on the line 4—4 of Fig. 1 with parts removed. Fig. 5 is a section taken on the line 5—5 of Fig. 1. Fig. 6 is a side elevation of the glass forming turrets to which the driving mechanism may be applied.

In the drawings there is shown a base support 10 on which there are mounted in spaced relation turret supporting and rotating spindles 11 and 12, said spindles being mounted for rotation upon the base 10 and carrying a parison mold turret 13 and a finish mold turret 14 adjacent each other, the invention being herein described and shown as applied to such a glass forming machine for purposes of illustration.

One of the spindles 11 carries a ring gear 15 below its turrets 13 and above the base 10, said ring gear being secured to the spindle of the turret rotating the same. A corresponding ring gear 16 is provided on the spindle 12, but at a slightly higher elevation than the gear 15. Thus, the lower edge of the gear 16 is in substantially the same plane as the upper edge of the gear 15. Said gears are driven by a plurality of embracing toothed racks 17, 18, 19 and 20.

The racks 17 and 18 extend parallel to each other in position to engage and disengage in meshing relation with the gear 15. The racks 19 and 20 are correspondingly arranged in parallel relation on opposite sides of the gear 16 for engagement and disengagement in meshing relation therewith. The racks 17 and 19 are secured in substantial alignment with each other, but in angular cross sectional relation as illustrated in a comparison of Figs. 3 and 4. Thus, it will be noted in said figures that the rack 19 is shown in cross section as mounted at an angle with respect to the rack 17, whereas in Fig. 1 they are shown in alignment. Similarly, the racks 18 and 20 are mounted in alignment, but in angular cross sectional relation, as will be evidenced by a comparison thereof shown in Figs. 3 and 4.

The adjacent ends of the aligned racks 17, 19 and 18, 20 are supported and connected by the clamps 21 carried by a carriage 22 slidably mounted for reciprocation upon the supporting rod 23 through a bearing 24. The rod 23 is secured and supported at both ends by the bracket supports 25. The opposite or free ends of the racks 17, 18 are locked to a yoke 26 to which there is secured a piston rod 27 having a piston 28 operating in an air cylinder 29. The air cylinder is provided in the usual manner with a throw valve chamber 30 and is fed through the compressed air and exhaust lines 31 and 32. At the opposite end of the drive the racks 19 and 20 are secured to the yoke 33 carried by a supporting guide rod 34 slidably mounted in the bearing housing 35 and all controlled through piston 36 operating in a bearing cylinder 37.

From the foregoing structure it will be noted that all four racks are simultaneously reciprocated by the air motor 29 and are supported and steadied in their reciprocable movement by the bearing support at the opposite end of the drive from the motor and the intermediate structure slidably carried on the rod 23.

The purpose of this drive is to rotate the spindles 11 and 12 in opposite directions, as indicated by the arrows in Fig. 1. The rack bar drive unit is given a rocking movement powered by the air cylinder 38, a pair of T-shaped rocking brackets being provided. A bracket 39 is pivotally supported at its upper or head portion upon the rod 23. The lower end is connected to a bar 40. The bar 40 is engaged and moved laterally at predetermined intervals by a connecting rod 41 driven through a piston 42 operating in the cylinder 38. The movement of said piston is controlled by the air lines 43 which in turn are controlled by a suitable valve mechanism, not shown, operating in timed relation with the valve mechanism in the throw valve chamber 30. Thus, at the end of each stroke of piston 28, the bar 40 is moved from one extreme position to the other. And in so moving, it rocks the bracket 39 which in turn moves one of the racks 17, 18 into meshing engagement with the gear 15, and elevates the other of such racks free from operative engagement therewith, as shown in Fig. 3. For this purpose the rack bars 17, 18 are each slidably supported between the oppositely disposed and spaced jaws 44 provided in the upper or head portion of the bracket.

A bracket 45, in all respects similar in structure and action to the bracket 39, is provided for slidably carrying and positioning the rack bars 19, 20 in and out of engagement with the gear 16, as shown in Fig. 4. This rocking bracket 45 is also operated by the bar 40 and, therefore, moves in the same direction and in timed relation with the previously described rocking bracket 39.

As illustrated in Figs. 3 and 4, when the controlling piston 42 is retracted, the rack bar 17 is moved into operative engagement with its pinion and the rack bar 20 with its pinion. Since these rack bars are on opposite sides of their respective pinions, a forward driving movement thereof in the direction of the arrow (Fig. 1) will rotate the spindle 11 in a clockwise direction. At the end of the driving stroke, movement of the rack bars will be temporarily arrested preparatory to movement in the opposite direction. During such period, the rack brackets will be shifted so as to swing the opposite rack bars 18, 19 into meshing engagement with their respective gears. Upon movement of the bars in the reverse direction, the spindles 11 and 12 will again be rotated in timed relation in their respective clockwise and counterclockwise directions. Thus, through the reciprocating movement of the rack bars and the rocking thereof from and into engagement with their respective gears, the spindles and their supported turrets will be caused to intermittently rotate in opposite directions in accurately timed relation.

As a safety factor, one of the clamping ends of the yoke 33 (Fig. 5) carries a safety arm 46 having a head thereon adapted to move under and over a stop block 47 mounted upon a bracket 48 supported upon the base. The relation of the safety arm to the stop block is such that when the drive is tilted with the racks 17, 20 in driving engagement, the head of the safety arm will ride over the block 47, and when said rack bars are lowered out of driving engagement said head will move under the block, as shown by dotted lines in Fig. 5. In event of some obstruction to the full tilting movement of the bars in or clear of driving engagement, the entire driving mechanism will be stopped by engagement of the safety arm against the end of the stop block. This arrangement comprises a mere safety factor. However, there is no problem involved in respect to the teeth of the rack bars readily sliding into mesh with the teeth of their respective gears for the reason that the teeth of the bars and gears are always properly spaced and aligned to permit of ready and positive meshing due to the fact that when their longitudinal movement is arrested, one rack bar slides into mesh while the other rack bar is sliding out of mesh but still in tooth engagement. Therefore, one rack bar keeps the other in true alignment for proper meshing.

The invention claimed is:

1. A driving mechanism for intermittently rotating a pair of spaced parallel spindles, including a driven gear on one of said spindles, a driven gear on the other of said spindles and positioned in a different but parallel plane to the first gear, a rigid rack bar driving unit movable into and out of driving engagement with opposite sides of said gears respectively, a motor operable to reciprocate said unit, a supporting bracket secured to said unit pivotally mounted axially of said spindles, and a power means connected with said bracket operable to tilt said bracket and unit about said pivotal mounting for simultaneously and alternately swinging the rack bars of said unit into mesh with said opposite sides of the respective gears, whereby each of said spindles will be intermittently rotated in opposite directions to each other.

2. A driving mechanism for intermittently rotating a spindle having a driven gear thereon comprising a pair of parallel extending oppositely disposed rack bars, a motor operable to reciprocate said rack bars as a rigid unit, a pivotal support for said rack bars, power means connected with said support operable at the end of each power stroke to swing said support about its pivotal mounting, to thereby raise one of said rack bars to slidably mesh with the teeth on one side of said gear and swing the other rack bar downwardly out of mesh with said teeth, and means for fixedly supporting said rack bars on said pivotal support with their teeth extending at a fixed angle to each other so arranged that said teeth will extend in parallel engaging relation with the teeth of said gear when in mesh therewith.

3. A driving mechanism for intermittently rotating a spindle having a driven gear thereon, comprising a pair of oppositely disposed rigid parallel rack bars, a motor operable to reciprocate said rack bars, power means connected with said rack bars operable at the end of each power stroke to move one of said bars into meshing engagement therewith and the other rack bar out of engagement therewith, and means for fixedly supporting said rack bars for reciprocable movement with their toothed faces extending at a fixed angle to each other and arranged relative to said gear to extend parallel with the teeth thereof when in meshing engagement.

4. A driving mechanism for intermittently rotating a spindle having a toothed gear secured thereabout, a pair of driven rack bars extending in parallel fixed relation on each side of said spindle, a motor operable to reciprocate said rack bars as a unit, a pivotal support for said rack bars, said rack bars being rigidly carried by said support on opposite sides of its pivot, their toothed faces extending at a fixed angle to each other so arranged that when said support is swung about its pivotal mounting in one direction one of said rack bars will be raised into driving engagement with said gear with their respective teeth in parallel relation and the other rack bar lowered out of engagement with said gear with its teeth extending at an angular relation, and upon swinging said support in the opposite direction said last-mentioned rack bar will be brought into parallel toothed driving relation with said gear and said first-mentioned rack bar lowered out of engagement therewith, and power means connected with said support operable at the end of each power stroke to swing said support and rack bars from one driving position to the other, whereby said spindle will be intermittently rotated by the reciprocating movement of said rack bars.

5. A driving mechanism for intermittently rotating a spindle having a toothed gear secured thereabout, a pair of driven rack bars extending in parallel fixed relation on each side of said spindle, a motor operable to reciprocate said rack bars as a unit, a pivotal support for said rack bars, said rack bars being rigidly carried by said support on opposite sides of its pivot, their toothed faces extending at a fixed angle to each other so arranged that when said support is swung about its pivotal mounting in one direction one of said rack bars will be raised into driving engagement with said gear with their respective teeth in parallel relation and the other rack bar lowered out of engagement with said gear with its teeth extending at an angular relation, and upon swinging said support in the opposite direction said last-mentioned rack bar will be brought into parallel toothed driving relation with said gear and said first-mentioned rack bar lowered out of engagement therewith, power means connected with said support operable at the end of each power stroke to swing said support and rack bars from one driving position to the other, whereby said spindle will be intermittently rotated by the reciprocating movement of said rack bars, a laterally projecting arm operatively connected to one of said rack bars, and a stop block fixedly mounted with respect to said spindle so positioned and arranged in respect to said arm as to obstruct its movement and the movement of said rack bars other than when said support has caused one of said bars to be clear of engagement with said gear.

6. A driving mechanism for intermittently rotating a pair of spaced parallel spindles, including a driven gear on one of said spindles, a driven gear on the other of said spindles positioned in a different but parallel plane to the first gear, a rigid rack bar driving unit provided with a pair of oppositely disposed spaced rack bars, one pair engageable with the opposite sides of each of said driven gears respectively, the teeth of one side of each pair of rack bars extending at a fixed angle with respect to the teeth of the other side thereof, a motor operable to reciprocate said unit in a plane parallel to the plane of said gears, a supporting bracket rigidly secured to said unit, means for pivotally mounting said supporting bracket centrally of said spindles, and power means connected with said bracket operable to tilt said bracket and unit about said pivotal mounting for simultaneously and alternately swinging the oppositely-disposed rack bars of each pair into and out of mesh with the opposite sides of the respective gears, the angularly disposed teeth of said rack bars having such relative arrangement that when moved out of engagement with the gear they will extend at an angle thereto and when moved into engagement therewith extend in parallel relation therewith, whereby each of said spindles will be intermittently rotated by said rack bars in opposite directions to each other.

7. A driving mechanism for intermittently rotating a spindle having a driven gear thereon comprising a pair of parallel extending oppositely disposed rack bars, a motor operable to reciprocate said rack bars as a unit, and so timed as to have a period of rest at the end of each stroke, a support for said rack bars, power means connected with said support operable at the end of each power stroke to move one of said bars into meshing engagement on one side of said gear and the other rack bar out of meshing engagement therewith, and means for fixedly supporting said rack bars relative to each other and to said gear with their teeth extending at a fixed angle so related that said gear will be temporarily engaged by both of said rack bars during the period of rest at the end of the stroke as one rack bar moves out of engagement and the other moves into engagement.

ANTHONY T. ZAPPIA.